United States Patent Office 3,180,236
Patented Apr. 27, 1965

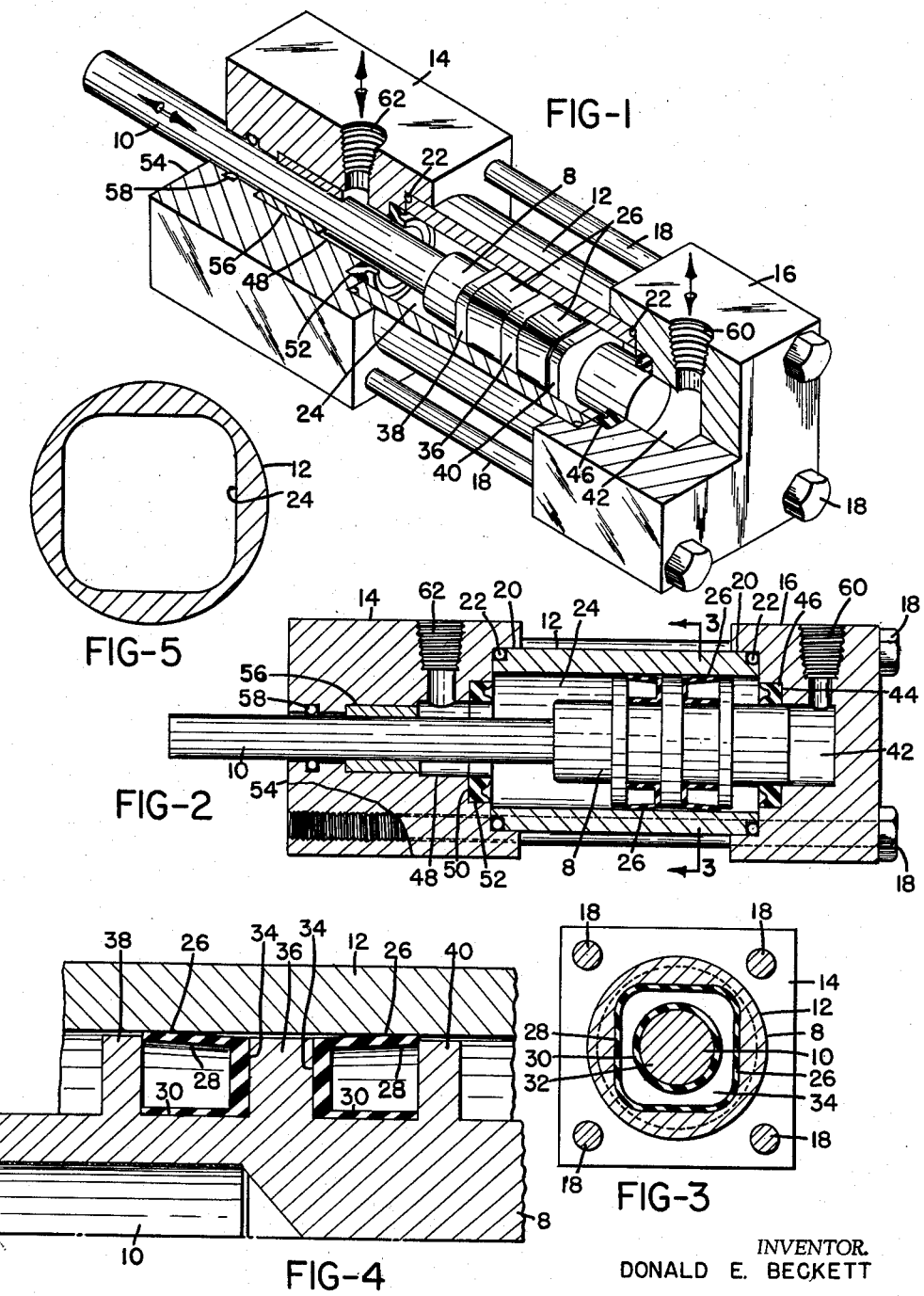

3,180,236
FLUID MOTOR CONSTRUCTION
Donald E. Beckett, Wilmington, Ohio, assignor to Beckett-Harcum Co., Wilmington, Ohio, a corporation of Ohio
Filed Dec. 20, 1962, Ser. No. 246,197
7 Claims. (Cl. 92—164)

The present invention relates to a fluid motor, and is concerned particularly with improvements in a motor of the piston-cylinder type in which the piston is reciprocated within the cylinder by the force of air or hydraulic fluid under pressure introduced to the cylinder.

An object of the invention is to provide a motor of the character referred to, in which the piston and piston rod are nonrotatable relative to the cylinder.

Another object is to provide in a device of the character stated, simple, durable, and inexpensive means for precluding rotation of a piston and piston rod within the pressure cylinder, with special emphasis upon avoiding leakage of fluid and loss of power.

These and other objects are attained by the means described herein and illustrated upon the accompanying drawings, in which:

FIG. 1 is a perspective cut-away view of the device embodying the present invention.

FIG. 2 is a vertical cross-section of the same.

FIG. 3 is a cross-section taken on line 3—3 of FIG. 2.

FIG. 4 is a greatly enlarged fragmentary cross-section through the piston of the device.

FIG. 5 is a transverse cross-section of the cylinder of the device.

In certain applications of the reciprocating fluid motor, it is found desirable to preclude any tendency of the piston rod to rotate relative to the cylinder in which it reciprocates. Various devices have been proposed for this purpose, including the use of exterior guides in one form or another operative upon the piston rod. In many instances, adequate space is not available for the attachment of exterior guides suitable to effectively eliminate piston rod rotation, and in other instances such guides present a safety problem. In accordance with the present invention, the aforementioned objections, along with some others, are fully met. The means for avoiding piston and rod rotation is desirably incorporated wholly within the cylinder, as will be explained.

With reference to the drawings, 8 indicates the piston mounted upon piston rod 10, and 12 indicates the cylinder in which the piston is reciprocable lengthwise thereof. The cylinder may be equipped with opposed heads 14 and 16 clamped against the ends of the cylinder in any suitable manner, as by means of long bolts or similar fasteners 18. The cylinder ends may be fitted into counterbores 20 of the heads, with suitable gaskets such as O-rings 22 inserted to preclude fluid leakage at the head connections.

The chamber 24 of cylinder 12 is non-circular in transverse cross-section, and, as shown in FIG. 5, may be substantially square with the corners rounded or filleted. Piston 8 is correspondingly shaped, and is dimensioned to have a close sliding fit within the cylinder chamber. The piston accordingly is precluded from rotating within the non-circular chamber while reciprocating therein.

The piston rings or seal members 26 have the same general exterior contour as the piston and the cylinder chamber, and may be molded or otherwise preformed of flexible rubber, plastic, or similar material designed to withstand the deteriorating effects of any fluid employed as the piston driving medium. Member 26 may include a continuous outer wall or flap 28 shaped to the contour of chamber 24, and an inner wall 30 of circular form to embrace the cylindrical turned core 32 of the piston. The walls 28 and 30 may be formed integrally with the transverse base portion 34 thereof. Base portions 34 may flatly abut a transverse intermediate dividing fin 36 of the piston, whereas the walls 28 and 30 of the seal members are confined by end fins 38 and 40 of the piston.

It will be understood that the outer walls or flaps 26 of the seal members are free to flex relative to the cylinder inner wall as the piston reciprocates, depending upon the direction of reciprocation. The seal members are to be flexible and resilient to the extent that they may be applied to or removed from their respective piston grooves by distortion and flexation thereof in passing the outer fins 38 and 40.

Cylinder head 16 may have a bore 42 to slidingly accommodate one end of piston 8, and a counterbore 44 in which is fitted a sealing gland 46 in which said end of the piston may move. Head 14 may be likewise provided with a bore 48, counterbore 50, and gland 52 to accommodate the opposite end of the piston. Bore 48, however, extends to the outer end 54 of head 14 and may contain a piston rod bushing 56 and an O-ring seal 58 for the rod.

For feeding and exhausting fluid under pressure to the cylinder chamber at opposite ends of the piston, the heads may be provided with ports 60 and 62, preferably threaded as shown for connecting supply pipes thereto. The ports are in fluid communication with the head bores 42 and 48.

From the foregoing, it will be apparent that a fluid under pressure delivered to port 62 will tend to move piston 8 to the right, while fluid is displaced through port 60. Conversely, fluid delivered to port 60 will move piston 8 to the left, with discharge occurring through port 62.

Apparent also is the fact that in all reciprocatory movements of the piston, no rotational movements thereof can occur due to the non-circular character of the piston and cylinder chamber. The construction avoids the need for any anterior guides or fixtures to prevent piston and rod rotation, and is foolproof and positive in action as well as simple and service-free.

While the desired result may be achieved by substantially squaring the piston and cylinder chamber as herein suggested, the parts may alternatively be accorded other shapes to accomplish the same result. For example, the parts mentioned may be made oblong, ovate, hexagonal, or of other geometrical shapes in cross-section, other than circular. In the broadest sense, the cross-sectional shape of the piston and cylinder chamber components should be non-circular of nature.

As used herein, the term "cylinder" is defined as a tubular body open at opposite ends, and having its interior passageway straight and of uniform cross-sectional configuration and size. The present invention features a tubular body whose interior passageway is non-circular in transverse cross-section normal to the major axis.

It is to be understood that various modifications and changes may be made in the structural details of the device, within the scope of the appended claims, without departing from the spirit of the invention.

What is claimed is:

1. The combination which comprises a piston and a tubular body having an elongate passageway in which the piston is slidingly reciprocable with close tolerance, said body having opposite end portions, a head closure member for each end portion of the body, said members each having an axial bore and a port for the introduction and exhaust of a fluid under pressure to move the piston, the bore of one of said members only being a through bore, a piston rod having an end mounted upon the piston axially thereof and extending slidingly within the through bore beyond the limits of the head closure member containing the through bore, the piston consisting of an elongate core body having cylindrical end portions and a pair of transverse end fins and an intermediate fin spaced from the end fins to provide spaced annular grooves, the said cylindrical end portions each extending from an end fin and the core body and fins comprising a single unit, a resilient seal member in each annular groove to sweep the elongate passageway of the tubular body as the piston reciprocates relative to the body, said seal-members, said piston fins, and said passageway each being non-circular in transverse cross-section normal to the major axis of the passageway.

2. The combination as set forth in claim 1, wherein the seal members are preformed initially to the approximate cross-sectional shape of the passageway.

3. The combination which comprises a piston and a tubular body having an elongate passageway in which the piston is slidingly reciprocable with close tolerance, said body having opposite end portions, a head closure member for each end portion of the body, said members each having an axial bore and a port for the introduction and exhaust of a fluid under pressure to move the piston, the bore of one of said members only being a through bore, a piston rod having an end mounted upon the piston axially thereof and extending slidingly within the through bore beyond the limits of the head closure member containing the through bore, the piston consisting of an elongate core body having cylindrical end portions and a pair of transverse end fins and an intermediate fin spaced from the end fins to provide spaced annular grooves, the said cylindrical end portions each extending from an end fin and the core body and fins comprising a single unit, a resilient seal member in each annular groove to sweep the elongate passageway of the tubular body as the piston reciprocates relative to the body, said seal members, said piston fins, and said passageway each being substantially rectangular in transverse cross-section normal to the major axis of the passageway.

4. The combination as set forth in claim 3, wherein the corner areas of the rectangular cross-sectional shapes are gently rounded off.

5. A fluid motor comprising a cylinder body, a head closure for each end thereof, means securing the cylinder body to and between said head closure bodies, the cylinder body having a piston chamber of non-circular cross-section, one head closure body having a blind bore opening into the piston chamber and having a fluid port extending therein from said bore to the exterior thereof, the other head closure body having a through bore with an inner end opening into said piston chamber and an opposite open outer end, said inner end of the through bore being enlarged to the same diameter through a portion of its length as said blind bore, said other head closure body having a fluid port extending to the exterior thereof from the said enlarged portion thereof, a piston in the piston chamber having an elongate core and encircling end fins and an intermediate fin spaced from the end fins and forming therewith annular sealing ring grooves, said piston core having extending from each end fin a terminal portion of circular cross section and of a diameter to enter snugly into the adjacent closure body bores, said fins each having a peripheral contour conforming to the said non-circular cross sectional contour of the piston chamber and fitting therein with close tolerance, an annular elastomer seal encircling the piston core in each sealing ring groove and embodying an inner wall part embracing the piston core, an outer flap part of the same non-circular contour as the fins and cylinder and a connecting base part lying against the intermediate fin, the said inner wall part and outer flap part having free edges engaging an end fin, a piston rod of smaller diameter than said core and extending from an end of the core through said through bore and beyond said outer end of the latter, and a piston rod sealing means in the through bore positioned outwardly from the said enlarged portion thereof.

6. The invention according to claim 5 wherein each of said bores is counter-bored at the piston chamber end thereof and a packing gland is seated in each counter-bore and snugly receives the adjacent cylindrical end of the piston core in the reciprocal movements of the piston in the chamber.

7. The invention according to claim 5, wherein the said wall part, flap part and base part of each seal is relatively thin and is of approximately constant thickness and said parts closely approach the same or a common thickness.

References Cited by the Examiner

UNITED STATES PATENTS

| | | | |
|---|---|---|---|
| 2,038,595 | 4/36 | Noble | 92—177 |
| 2,263,151 | 11/41 | White | 92—177 |
| 2,710,595 | 6/55 | Peterson | 91—26 |
| 2,755,775 | 7/56 | Flick | 92—244 |
| 2,804,052 | 8/57 | Halladay | 91—26 |
| 2,935,047 | 5/60 | Ortman | 91—408 |

KARL J. ALBRECHT, *Acting Primary Examiner.*